United States Patent

[11] 3,563,278

[72] Inventors Daniel J. Schardein;
Erik F. Barkman; David R. Johnson; Ben W. Lillethorup, Henrico County, Va.
[21] Appl. No. 676,960
[22] Filed Oct. 20, 1967
[45] Patented Feb. 16, 1971
[73] Assignee Reynolds Metals Company
Richmond, Va.

[54] AIR DUCT MEANS FOR A BUILDING CONSTRUCTION
22 Claims, 35 Drawing Figs.

[52] U.S. Cl. ................................................. 138/107, 138/125, 138/138, 138/157
[51] Int. Cl. ................................................. F16l 3/00, F16l 11/04, F16l 11/14
[50] Field of Search ...................................... 52/(Inquired); 29/(Inquired); 138/107, 118, 134, 135, 136, 137, 138, 139, 140—153, 156—172, 178 (Digest)

[56] References Cited
UNITED STATES PATENTS

| | | | |
|---|---|---|---|
| 2,861,598 | 11/1958 | Carder et al. | 138/Metal Foil |
| 2,937,664 | 5/1960 | Plummer | 138/Metal Foil |
| 2,975,808 | 3/1961 | Schilder | 138/143 |
| 2,982,457 | 5/1961 | D'Alelio | 138/Metal Foil |
| 3,044,498 | 7/1962 | Barnes et al. | 138/Metal Foil |
| 3,212,529 | 10/1965 | Ullman et al. | 138/141 |

Primary Examiner—Houston S. Bell, Jr.
Attorney—Glenn, Palmer, Lyne, Gibbs & Thompson ABSTRACT: This disclosure relates to air duct means for a building construction and method of making same in which said air duct means is made substantially of metallic foil and is readily collapsible for storage and handling and readily expandible for fastening to associated supporting means comprising the building construction to thereby enable provision of an economical air conduit system in such building construction.

PATENTED FEB 16 1971 3,563,278

INVENTORS
DANIEL J. SCHARDEIN
ERIK F. BARKMAN
DAVID R. JOHNSON
BEN W. LILLETHORUP
BY Glenn, Palmer + Lyne

THEIR ATTORNEYS

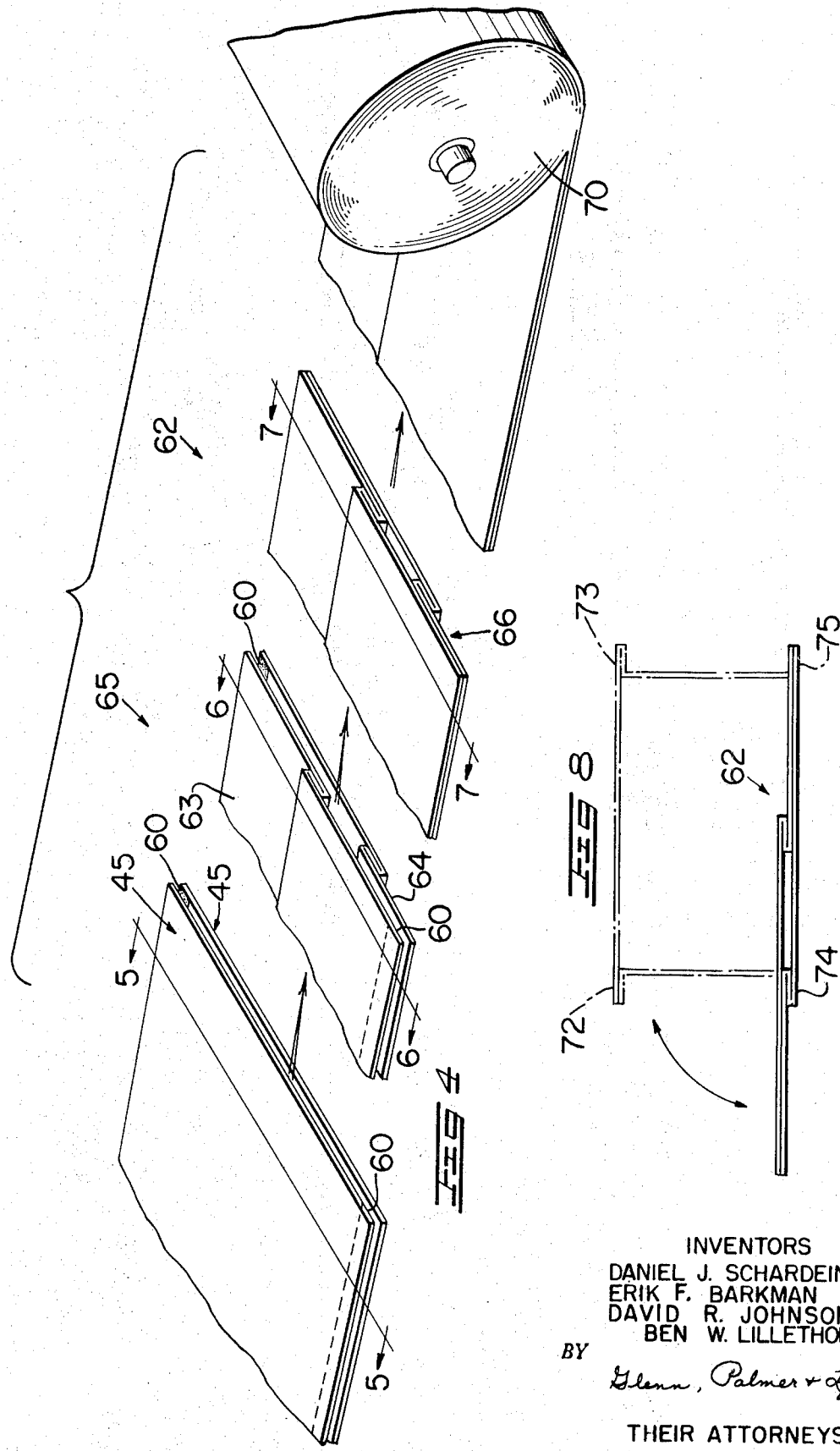

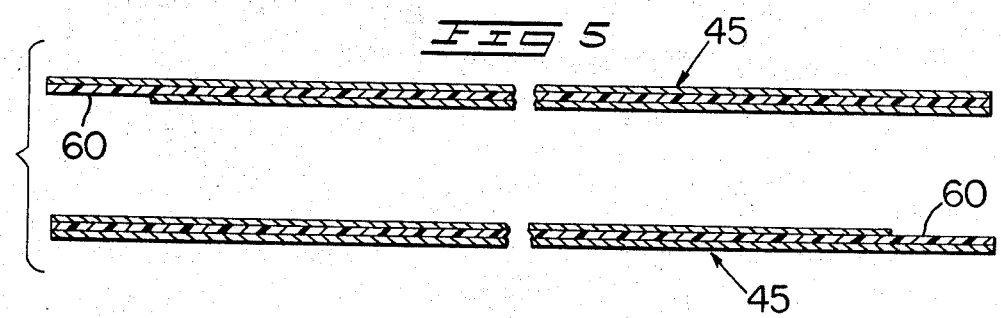
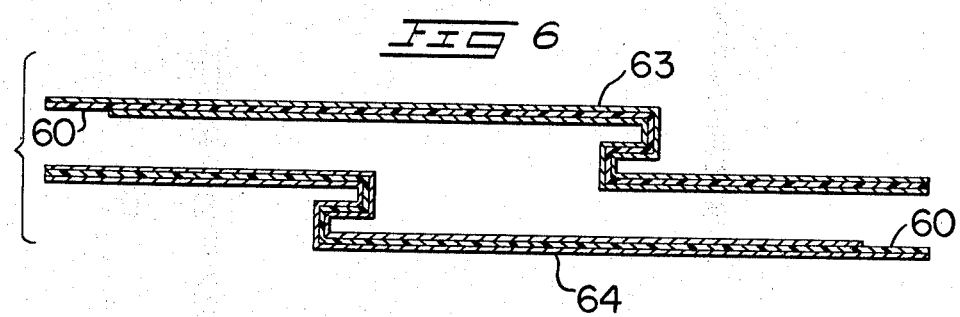
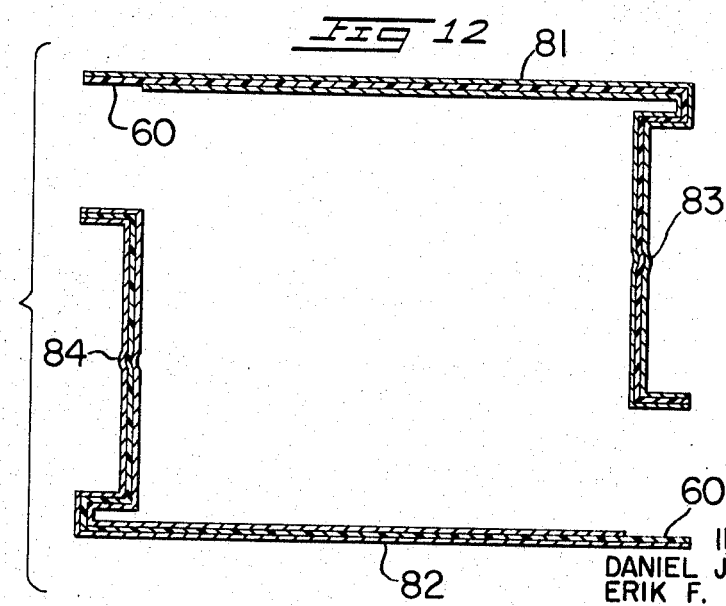

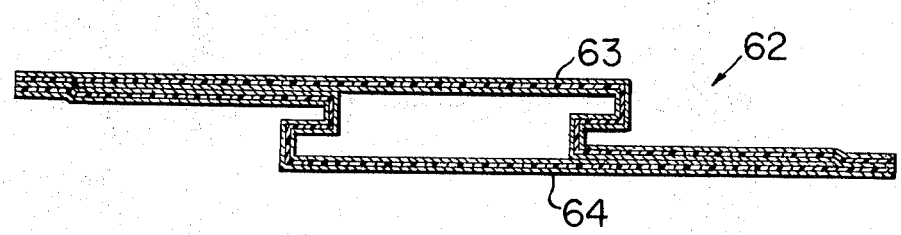
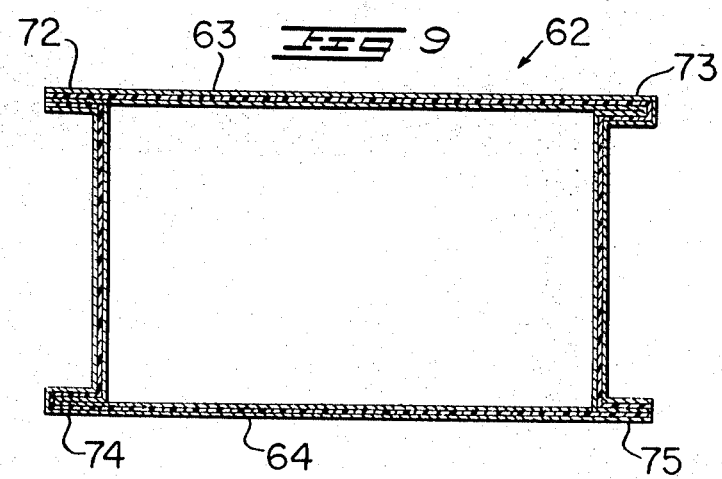
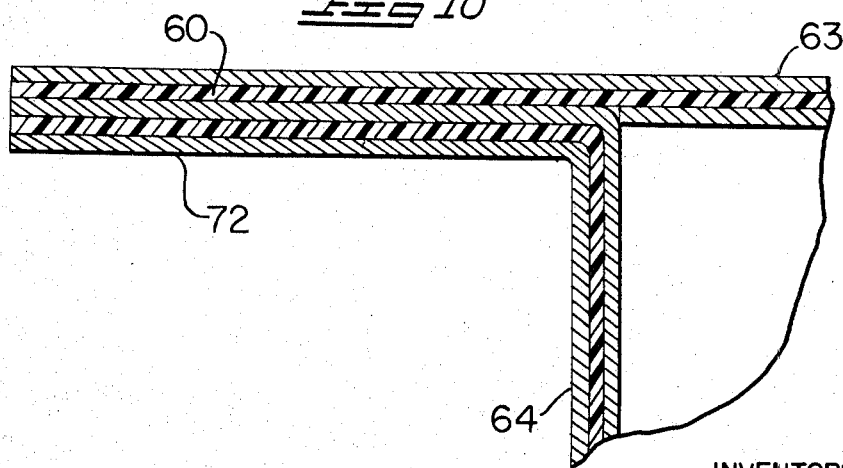
INVENTORS
DANIEL J. SCHARDEIN
ERIK F. BARKMAN
DAVID R. JOHNSON
BEN W. LILLETHORUP
BY
*Glenn, Palmer & Lyne*
THEIR ATTORNEYS

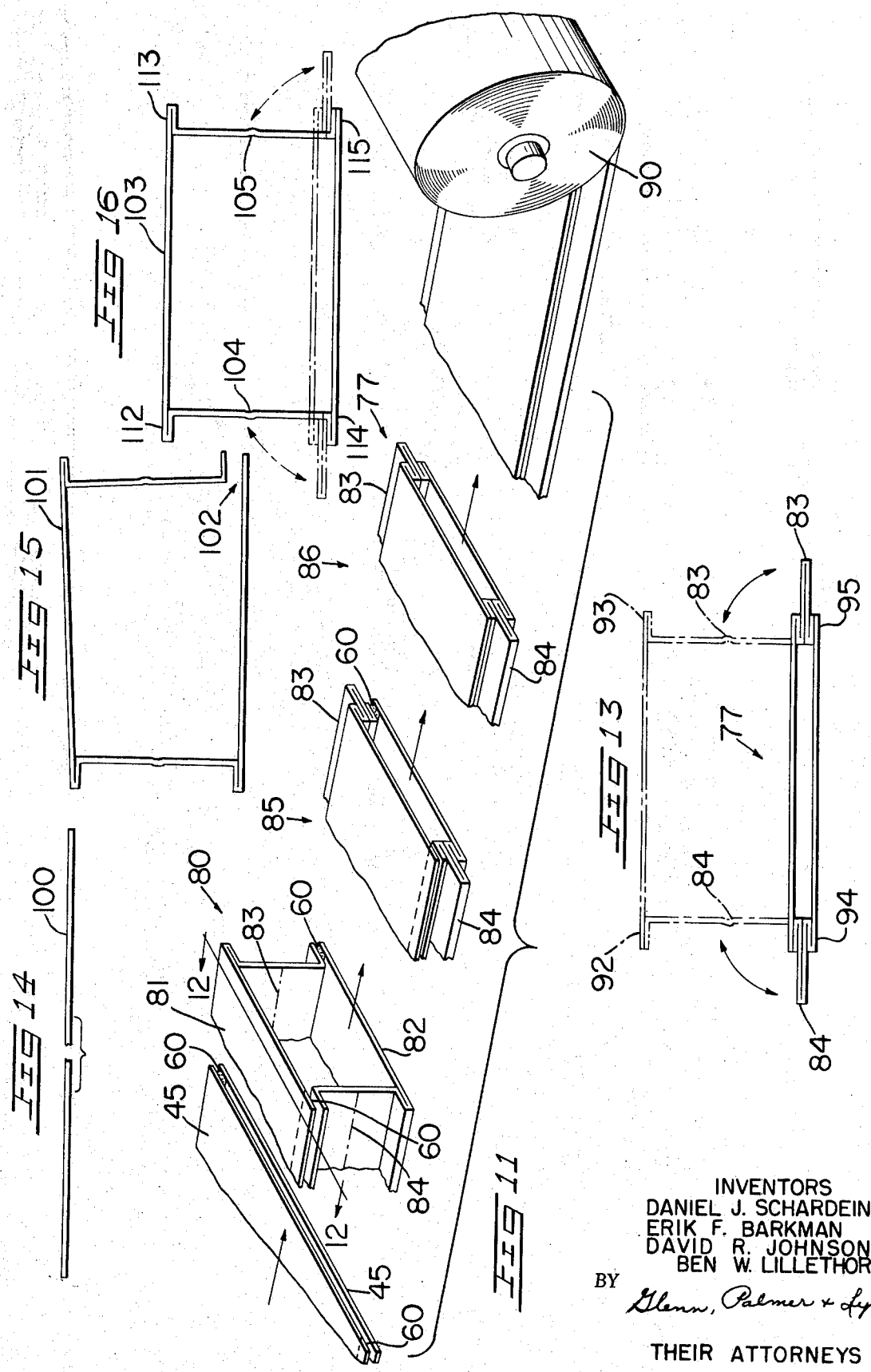

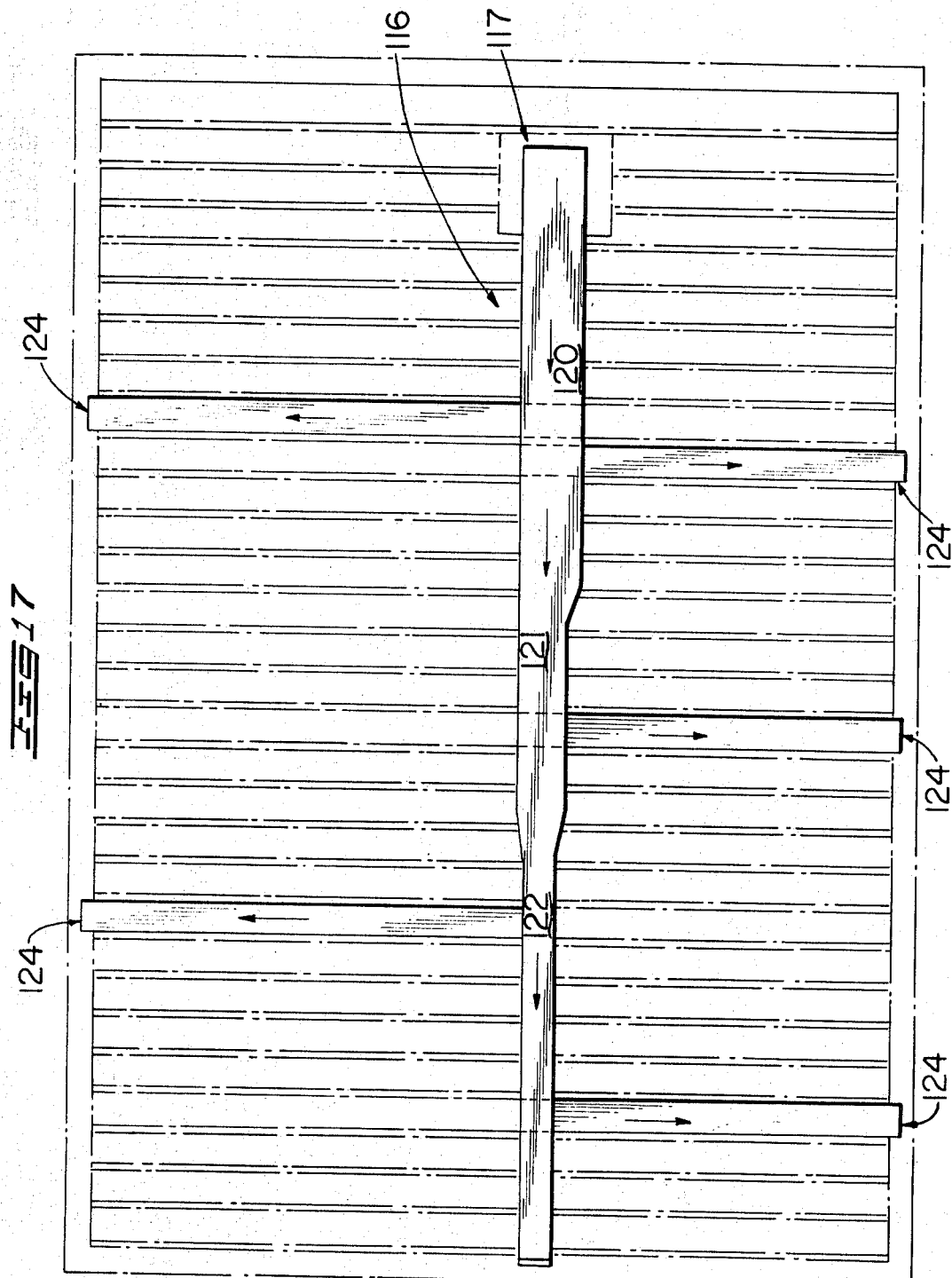

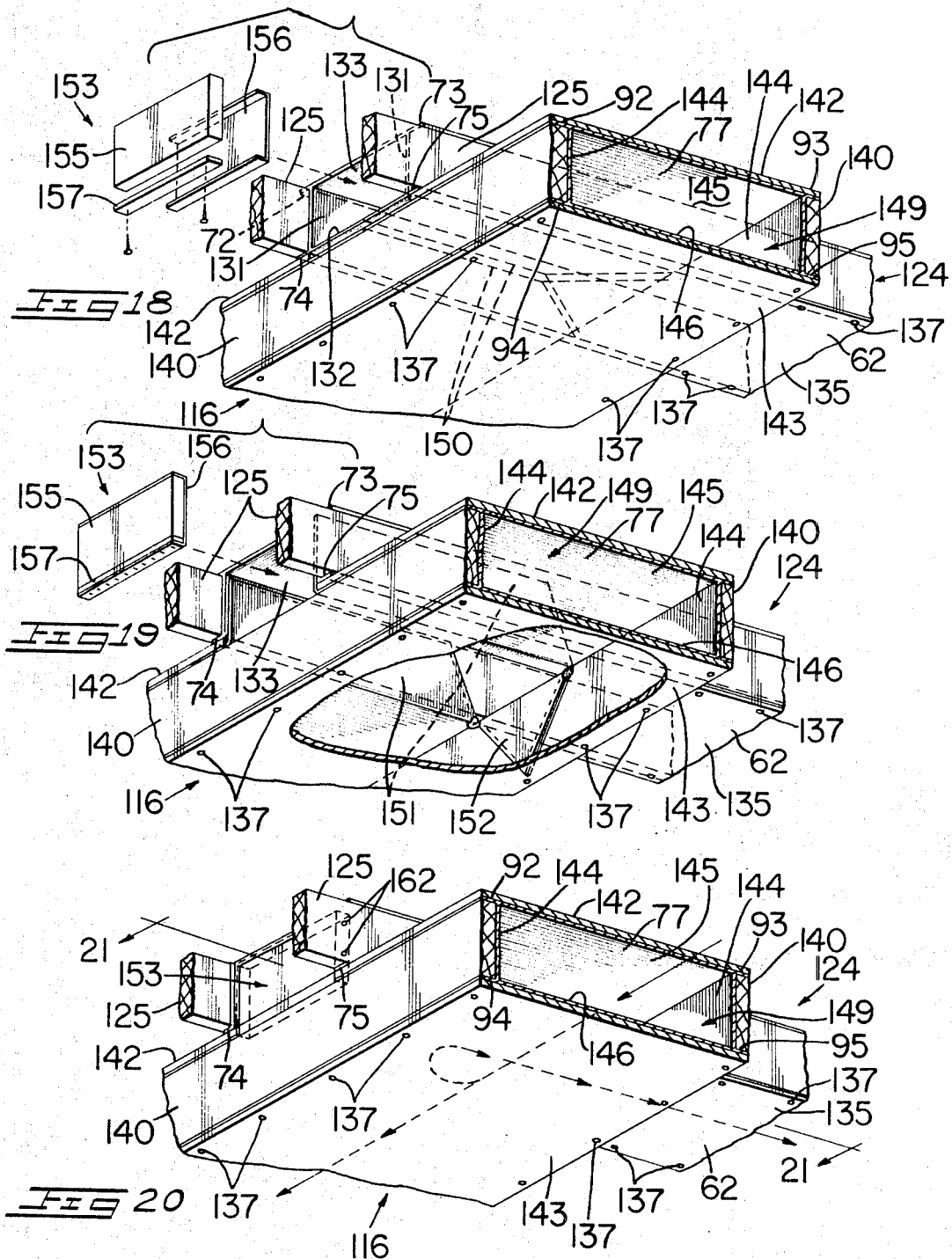

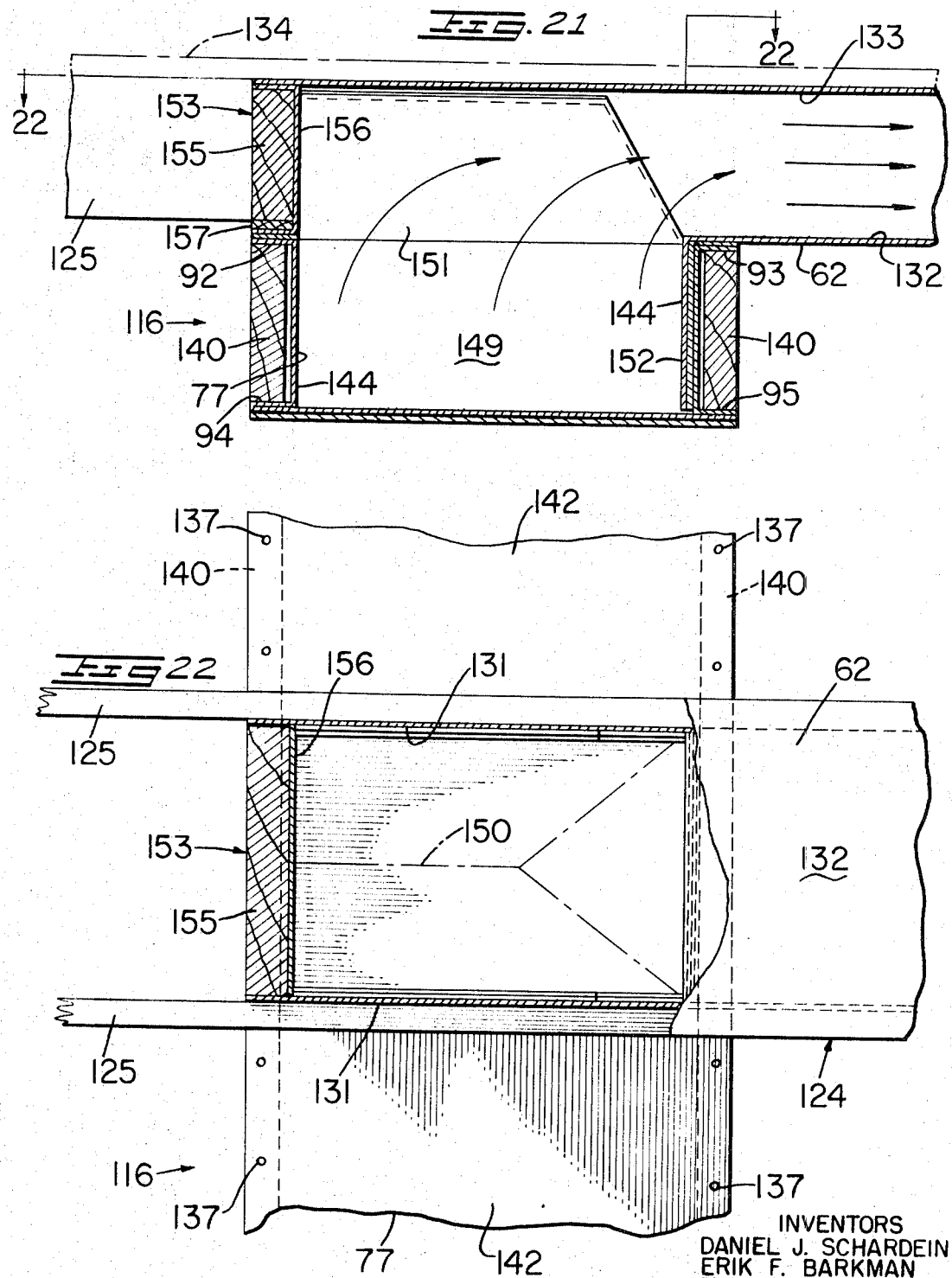

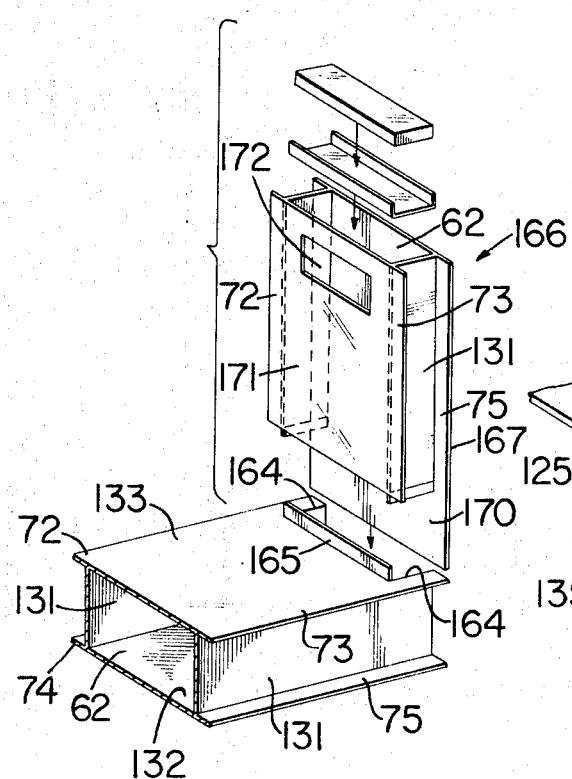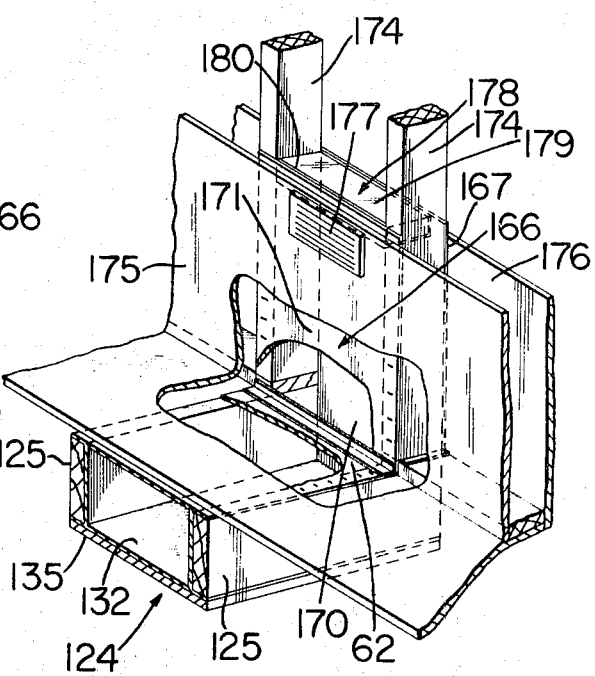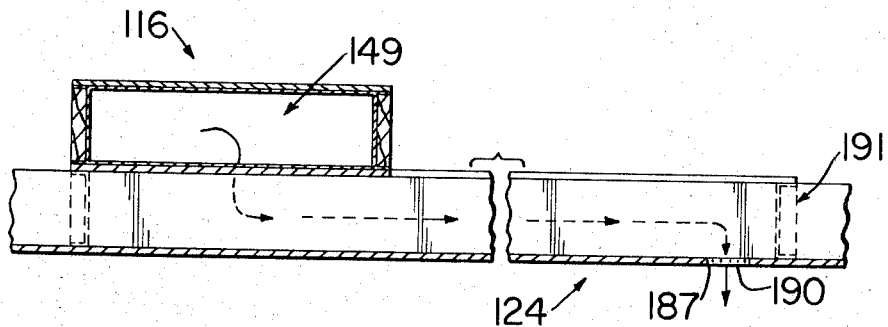

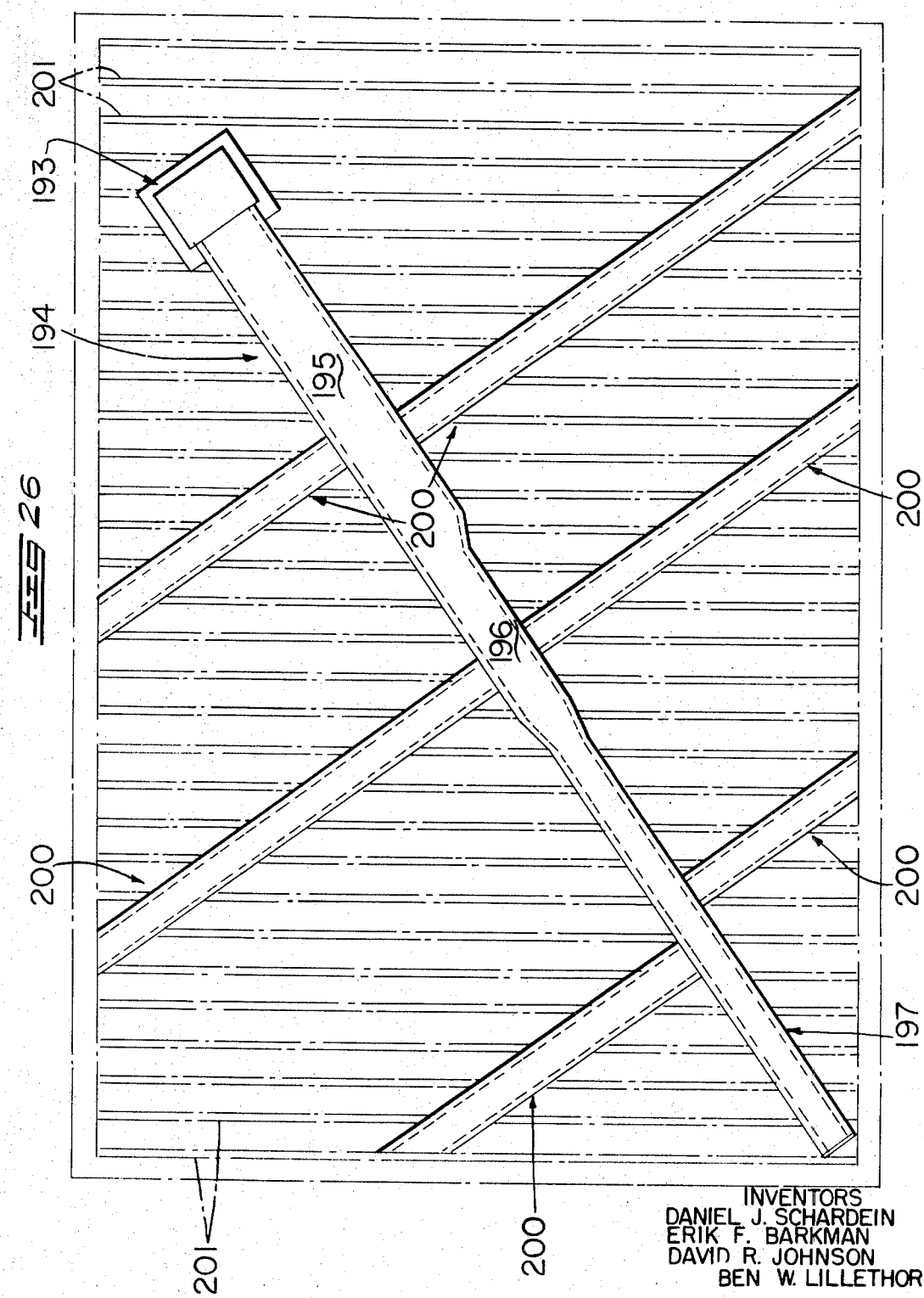

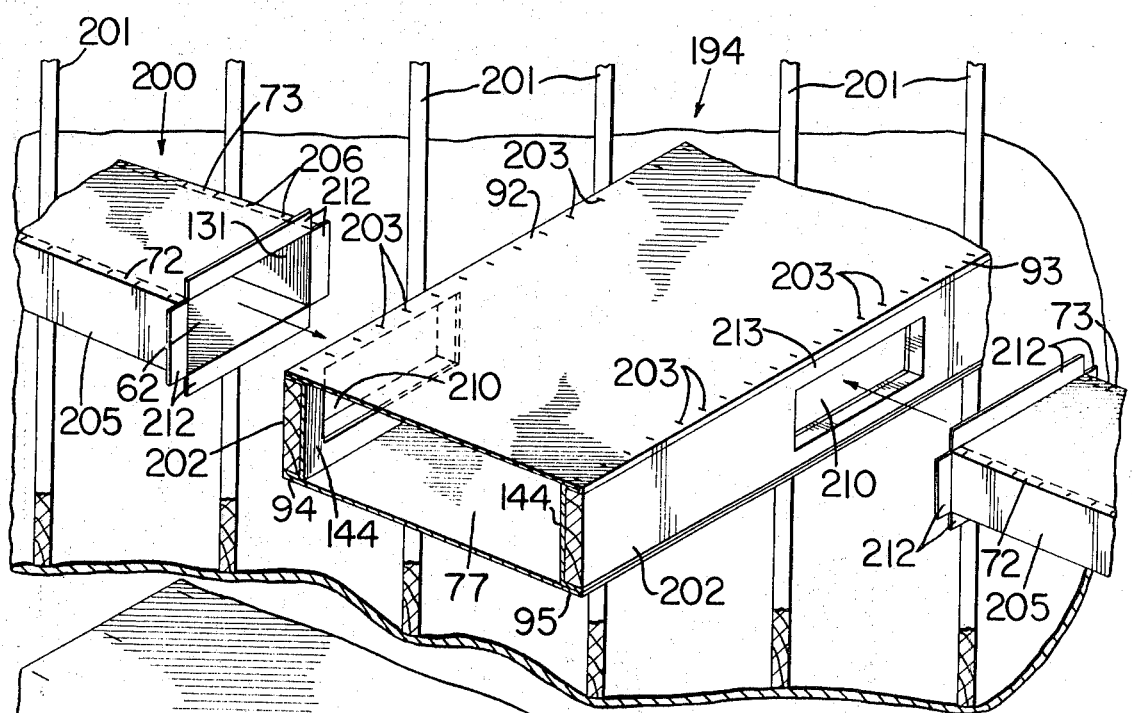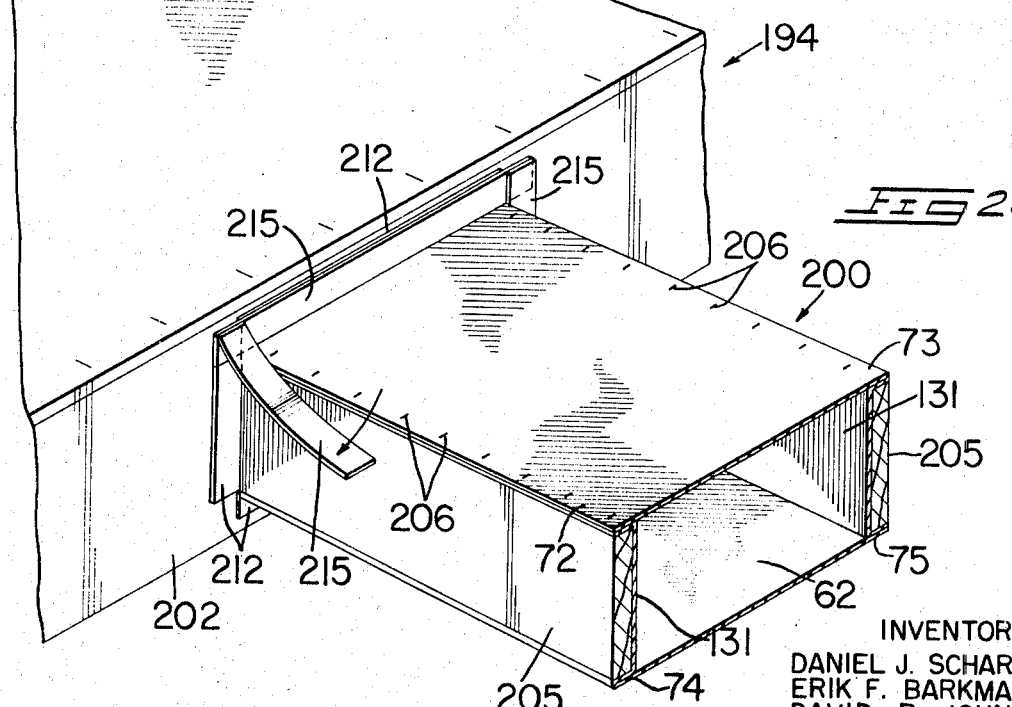

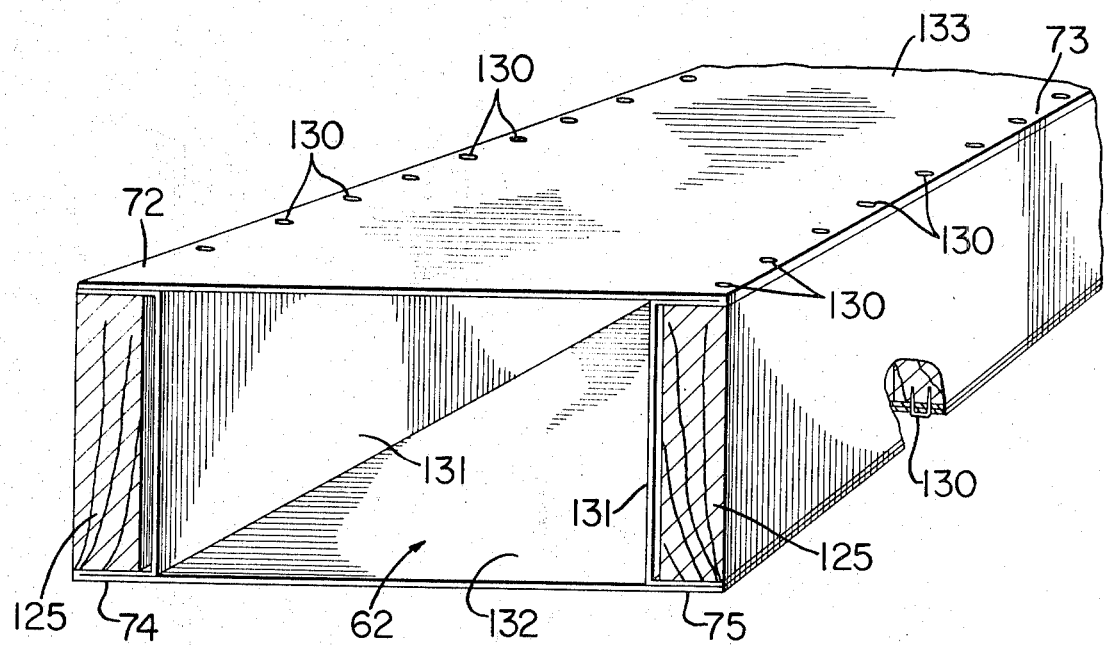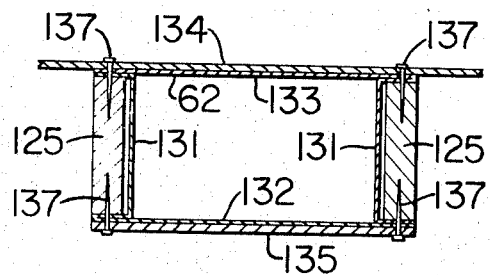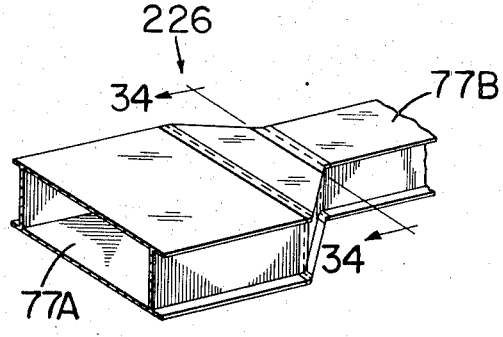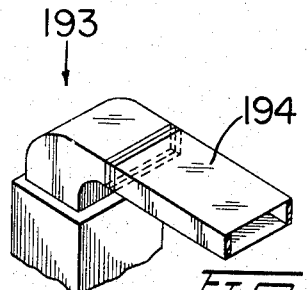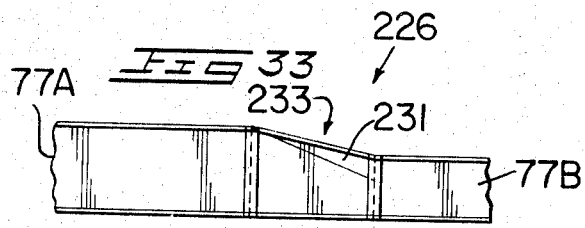

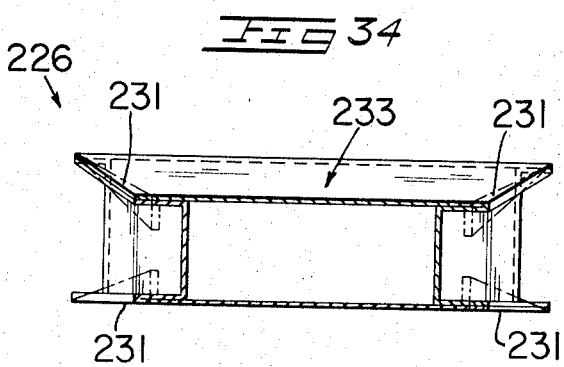
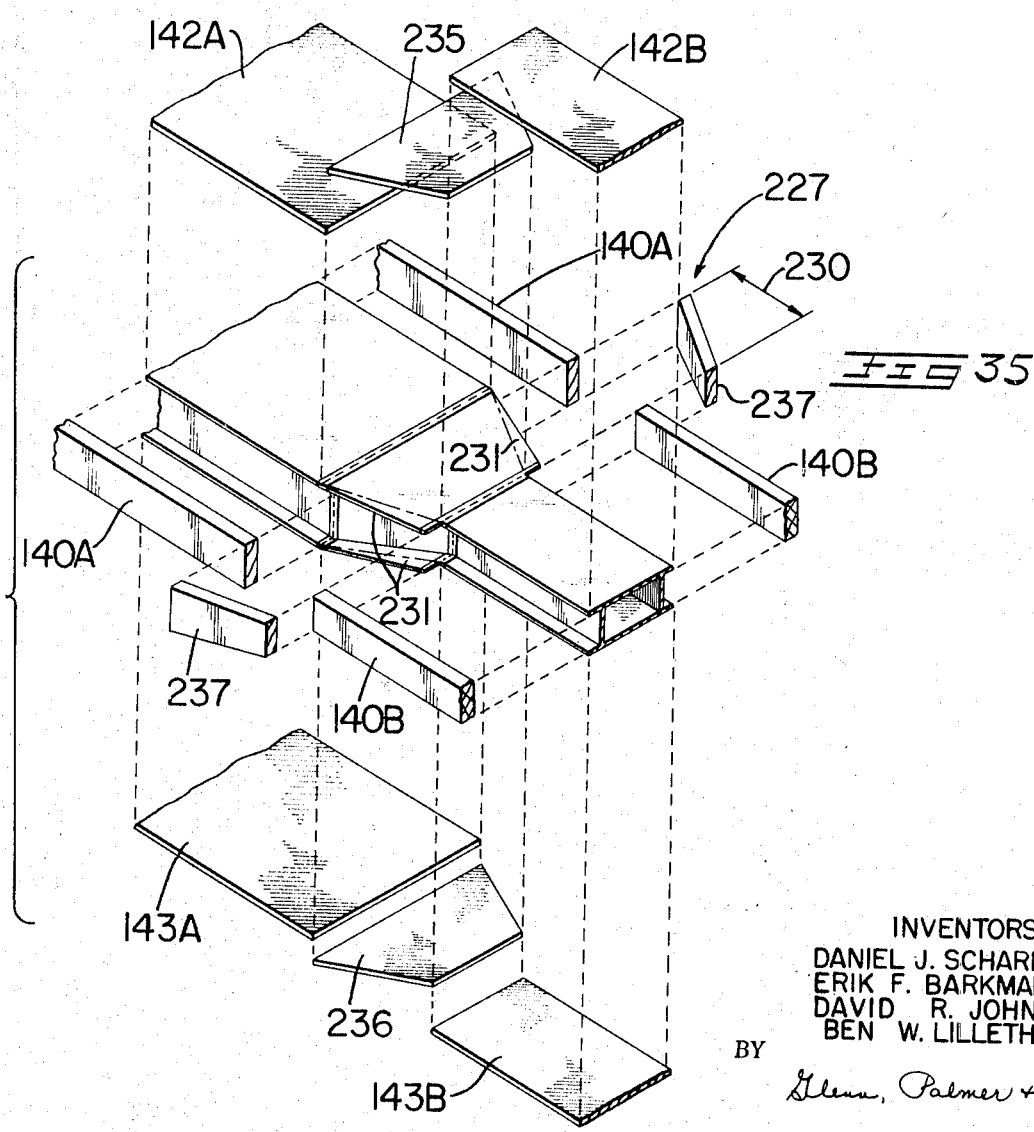

3,563,278

AIR DUCT MEANS FOR A BUILDING CONSTRUCTION

BACKGROUND OF THE INVENTION

An expensive item in the provision of an air circulating system in a building construction is the provision and installation of suitable air conduit means. One of the common approaches is to provide and install rigid ducts made of corrosion resistant materials for flowing air from a source such as a heating furnace or an air conditioning unit to a plurality of outlets. However, such rigid ducts are comparatively expensive, require considerable time to install and must be installed by skilled technicians, whereby the total cost to utilize such rigid ducts in a building construction is very high.

SUMMARY

This invention provides an improved collapsible and expandible air duct means and method of making same wherein such air duct means is made substantially of metallic foil. In addition, the air duct means of this invention is of simple and economical construction, easy to store and handle, and comparatively simple to install in a building construction at minimum installation costs while also utilizing to maximum advantage the existing structural members ordinarily required in such building construction to support the air duct means of this invention.

Other details, uses, and advantages of this invention will become apparent as the following description of the exemplary embodiments thereof presented in the accompanying drawings proceeds.

BRIEF DESCRIPTION OF THE DRAWINGS

The accompanying drawings illustrate present preferred embodiments of this invention, in which:

FIG. 4 is a perspective view illustrating the sequence used to form one exemplary embodiment of duct means of this invention wherein a pair of sections of the sheet means of FIG. 2 are suitably arranged one above the other, preformed to the desired configuration and flattened, suitably heat sealed together along opposite side edges to define flattened duct means, and then rolled into a suitable roll for storage and handling;

FIG. 5 is a sectional view of exaggerated thickness on the line 5–5 of FIG. 4;

FIG. 6 is a sectional view on the line 6–6 of FIG. 4;

FIG. 7 is a sectional view on the line 7–7 of FIG. 4;

FIG. 8 illustrates the manner of expanding the collapsed duct means illustrated in FIG. 7 for use in a building construction;

FIG. 9 is a sectional view of the duct means of FIG. 7 in its expanded condition;

FIG. 10 is an enlarged fragmentary sectional view of exaggerated thickness of the left-hand corner of the duct means as shown in FIG. 9;

FIG. 11 is a perspective view similar to FIG. 4 of the drawings and illustrating the manner of forming another exemplary embodiment of duct means of this invention also using a pair of sections of the sheet means of FIG. 2;

FIG. 12 is a sectional view of exaggerated thickness on the line 12–12 of FIG. 11;

FIG. 13 illustrates the manner of collapsing the duct means of FIG. 12 prior to heat sealing opposite side edges thereof and the manner of expanding such duct means for use in a building construction;

FIG. 14 is a fragmentary view illustrating a single sheet means used to make another exemplary embodiment of duct means of this invention;

FIG. 15 is a view illustrating the manner of forming the single sheet means of FIG. 14 to define the embodiment of duct means made from such single sheet means;

FIG. 16 illustrates by solid lines the formed sheet means of FIG. 15 fastened to define duct means and also illustrates by dotted lines the manner of collapsing such duct means for easy storage and handling thereof;

FIG. 17 is a view looking upwardly toward the floor joists of a building construction illustrating the duct means of this invention utilized to provide a trunk line from an air supply as well as distribution or feeder ducts extending from such trunk line;

FIGS. 18, 19, and 20 present a series of fragmentary perspective views illustrating the manner of interconnecting an individual duct means of this invention which is installed between a pair of floor joists with an associated trunk line also made using the duct means of this invention;

FIG. 21 is a sectional view on the line 21–21 of FIG. 20;

FIG. 22 is a view with parts broken away looking down through the completed passage means provided in the individual duct means of FIG. 20 toward the trunk line arranged therebeneath;

FIG. 23 is a perspective view illustrating the manner of assembling sections of duct means of this invention to form a riser to an associated air register;

FIG. 24 is a fragmentary perspective view illustrating the individual air register installed in position and illustrating the arrangement of associated duct means and supporting floor and wall members;

FIG. 25 is a fragmentary view illustrating the manner of providing an air register in duct means provided in a ceiling installation;

FIG. 26 illustrates another technique utilized to distribute air using the duct means of this invention from an air supply through a trunk line arranged diagonally across the joist means provided in a ceiling construction and showing individual feeder means extending from the trunk line;

FIGS. 27 and 28 present a pair of perspective views with parts broken away showing an exemplary technique for fastening the individual feeder duct means of FIG. 26 to their associated trunk line;

FIG. 29 is a fragmentary sectional view illustrating the installation of the duct means of this invention in position between associated floor joists prior to the installation of an associated subfloor and protective surface means extending between the terminal lower end of the associated floor joists;

FIG. 30 is a perspective view with parts broken away particularly illustrating the manner of fastening the fastening flange means comprising the collapsible and expandible duct means of this invention in position between a pair of parallel joists;

FIG. 31 is a perspective view of a typical bonnet used to connect the collapsible and expandible air duct means of this invention to an associated air supply;

FIG. 32 is a fragmentary perspective view illustrating a completed transition duct means used to connect duct means of one cross-sectional area to duct means of a smaller cross-sectional area;

FIG. 33 is a fragmentary side elevation of the transition duct means as illustrated in FIG. 32;

FIG. 34 is a view on the line 34–34 of FIG. 32; and

FIG. 35 is an exploded perspective view particularly illustrating the manner of making the transition means of FIG. 32.

DESCRIPTION OF ILLUSTRATED EMBODIMENTS

Figure 1:
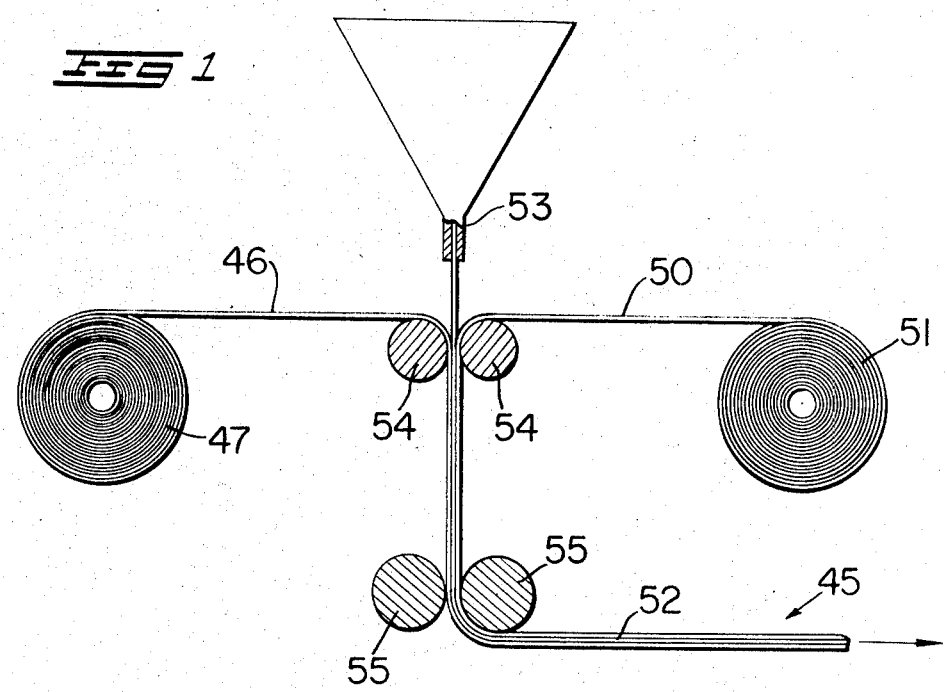
FIG. 1 is a schematic view illustrating the manner of extruding a plastic material between a pair of sheets of metallic foil to define multilayer sheet means used to form the duct means of this invention.
Figure 2:
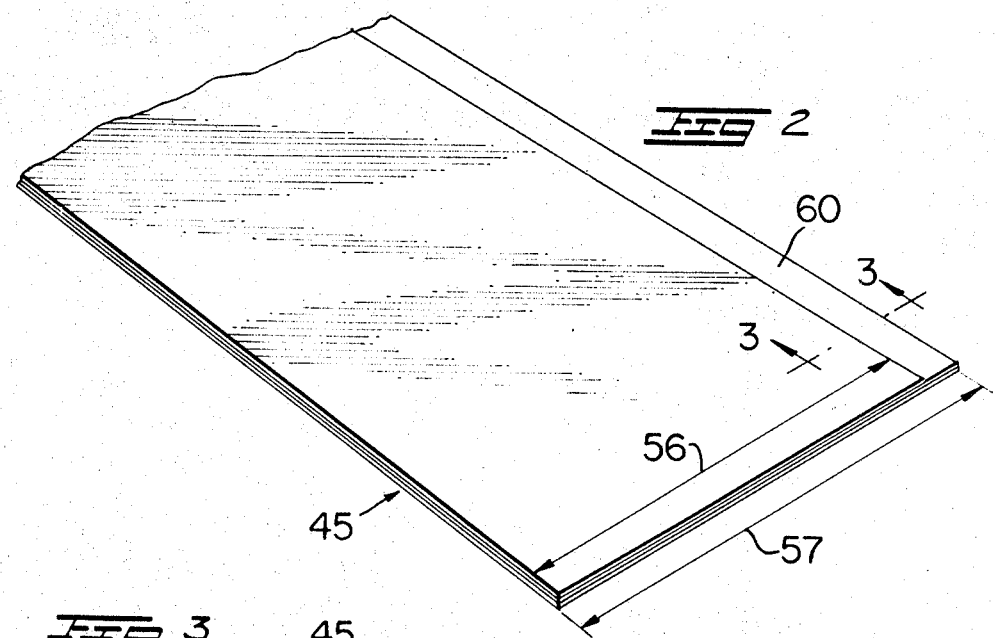
FIG. 2 is a fragmentary perspective view of exaggerated thickness illustrating multilayer sheet means as formed by the method illustrated in FIG. 1.
Figure 3:
FIG. 3 is a cross-sectional view on the line 3–3 of FIG. 2.

The exemplary duct means of this invention is preferably made from sheet means designated generally by the numeral 45 in FIGS. 1 and 2 of the drawings and comprised of a plurality of webs or layers which are suitably laminated together in any known manner. In addition, each web or layer is made of a material which is impermeable to fluids such as air. The sheet means or sheet 45 shown in FIG. 2 is made of a web or layer of metallic foil designated by the numeral 46 which is provided in roll form as shown at 47 and comprises one outside surface of sheet 45 while the other outside surface of sheet means 45 is defined by another web or layer of metallic foil designated by the numeral 50 and provided in roll form as shown at 51. A sheet means of impermeable plastic material designated by the numeral 52 is preferably laminated between the sheets of impermeable metallic foil 46 and 50 and in this example of the invention the plastic material which forms sheet means 52 is preferably extruded between sheets 46 and 50 through suitable nozzle means designated by the numeral 53.

Sheet 45 is formed upon unrolling the webs 46 and 50 from their respective rolls 47 and 51 and passing such webs around a pair of laminating rolls each designated by the numeral 54. The plastic material which forms plastic sheet 52 is preferably a thermoplastic material which is extruded in molten form between sheets 46 and 50 at a location adjacent rolls 54 and the resulting laminated construction is then passed between a pair of suitable chill rolls of known construction and each designated by the numeral 55 to thereby securely bond the plastic sheet 52 between metallic sheets 46 and 50 to form the laminated sheet means 45.

In this example of the invention the sheet or web 50 has a width as shown at 56 in FIG. 2 which is smaller than the width of sheet 46 as shown at 57. With this arrangement it will be seen that upon extruding the plastic layer 52 between sheets 46 and 50 an elongated strip of heat sealable material designated by the numeral 60 is provided along one side edge of the sheet 45 and strip 60 comprises an integral portion of the elongated sheet 45. The elongated strip 60 of heat sealable plastic material is utilized in a manner as will be subsequently described to define the several exemplary embodiments of duct means of this invention.

The exemplary multilayer sheet 45 presented in FIG. 2 of the drawings is shown as having a plurality of three layers wherein the two outside layers are made of metallic foil and the center layer is made of a heat sealable plastic material. However, it will be appreciated that the sheet means used to form the improved expandible and collapsible duct means of this invention may have any desired number and arrangement of the various layers. In addition, it will also be appreciated that it may be preferred to provide a web of preformed plastic sheet means on a suitable supply roll thereof and such sheet means may then be laminated between the sheets 46 and 50 of metallic foil in a known manner.

The elongated strip of plastic material 60 provided in sheet 45 is preferably utilized to fasten another associated adjoining sheet thereagainst after suitably preforming both sheets and thereby define one embodiment of duct means of this invention. Also, each strip 60 comprises a portion of fastening flange means for such duct means and the width of each fastening flange means thus defined corresponds to the width of its associated elongated strip 60.

One exemplary embodiment of duct means of this invention which is defined from sheet means 45 is illustrated in FIGS. 4-—10 of the drawings. Thus, as seen in FIG. 4 of the drawings a pair of sections of sheet 45 are arranged one above the other in spaced apart relation and so that exposed strips 60 are provided along opposite sides of the sections of sheet 45. Further, each elongated strip 60 is provided so that it faces toward the opposite sheet 45 and is adapted to be sealed thereagainst.

The illustration presented in FIG. 4 shows the sequential steps used in forming one example of collapsible and expandible duct means of this invention which is designated generally by the numeral 62. Each section of sheet 45 is formed using any suitable forming equipment and then collapsed or folded to define a pair of sheet means having the configuration illustrated in the second step of FIG. 4 which is designated by the numeral at 65. For ease of identification and description the formed sections of sheet means have been designated by the numerals 63 and 64 for the top and bottom sheet means respectively.

The sheet means or formed sheets 63 and 64 are then suitably fastened along side edge means thereof and in this example of the invention the opposite side edges are fastened together by heat sealing to define the flattened or collapsed construction illustrated at 66. Collapsed sheets 63 and 64 are preferably fastened together by compressing their opposite side edge portions between a pair of heated rolls, or the like, to thereby heat seal such side edge portions together. The resulting collapsed configuration duct means 62 is then preferably coiled in roll form to define a supply roll designated by the numeral 70.

Thus, it is seen that air duct means 62 is readily collapsed to enable rolling duct 62 on a suitable roll 70 thereof and the construction of duct 62 is such that it may be readily expanded into a tubular configuration for installation in a building construction.

Having described the overall technique of forming duct means 62 in connection with FIG. 4, a detailed presentation will now be made showing the sheet means used to define duct 62 in various stages of manufacture particularly showing the detailed arrangement of the various layers of sheet means in the various sectional views while showing such layers with exaggerated thicknesses for a better understanding of the duct means of this invention.

As seen in FIG. 5 of the drawings, sheets 45 are arranged so that elongated strips 60 are provided adjacent opposite side edges of the construction and so that each strip 60 faces toward the oppositely arranged sheet 45. Each sheet is then suitably formed and collapsed to the configuration illustrated in FIG. 6 and the formed sheets designated by the numerals 63 and 64 are then bonded together to define the flattened duct 62 as shown in FIG. 7.

The flattened or collapsed duct means or duct 62 is easily expanded from its solid line position to the dotted line position illustrated in FIG. 8 of the drawings and such expanded duct 62 is shown in cross section in FIG. 9 of the drawings. Thus, it is seen that the sheet means 63 and 64 are suitably formed, as by suitable scoring for example, to the desired configuration and then bonded together along opposite side edges.

Each sheet means 63 and 64 is preformed as shown in FIG. 7 to completely define an integral fastening flange intermediate its side edges. In addition, each strip 60 is utilized to define a part of an associated fastening flange wherein the resulting duct means 62 has a plurality of flanges and in particular each duct 62 has an integral multiple thickness substantially continuous flange extending from each of its corners. Thus, it is seen that the duct 62 has a pair of integral upper flanges designated by the numerals 72 and 73 and a pair of integral lower flanges designated by the numerals 74 and 75.

The manner in which the two formed sheet means 63 and 64 are heat sealed together using each elongated strip 60 to define fastening flange means is presented in enlarged cross-sectional view in FIG. 10 of the drawings. In particular, it will be seen that the resulting fastening flange means 72 has a multiple thickness and in this example each formed sheet means 63 and 64 is made essentially of three layers wherein one of the metallic layers of metallic foil is of reduced width to thereby expose the heat sealable plastic strip 60, whereby the resulting fastening flange 72 (as well as flange 75) has five layers of material. Fastening flanges 73 and 74 are each comprised of six layers of material.

This multiple layer configuration of the fastening flanges 72—75 enables the readily expandible and collapsible duct 62 to be fastened in position against supporting means such as supporting joist means of a building construction in a manner as will be described in detail subsequently and with little chance of tearing duct 62 or its fastening flanges.

Any suitable technique may be utilized to preform the various sections of sheets 45 to define sheet means 63 and 64 as illustrated in FIG. 6 of the drawings. However, in this disclosure of the invention, and by way of example, sheet means 63 and 64 have been formed utilizing rectilinear score means as previously mentioned. The provision of such score means has enabled the forming of the sheet means 63 and 64 without damage to the particular metallic foil or plastic sheet means provided.

Another exemplary embodiment of expandible and collapsible duct means of this invention is illustrated in FIGS. 11—13 of the drawings and designated generally by the numeral 77. In this latter embodiment a pair of sections of sheet means 45 is again utilized and preformed by suitably scoring, or the like, as in the previous embodiment to define a pair of oppositely arranged preformed sheet means designated by the numerals 81 and 82 and shown at 80 in FIG. 11. The sheet means 81 and 82 are similar to the sheet means 63 and 64 of the duct means 62 previously described and each sheet means 81 and 82 has an elongated strip 60 along a side edge thereof as described previously for duct means 62.

Each sheet means 81 and 82 of this exemplary duct means 77 has rectilinear score means provided therein and designated respectively by the numerals 83 and 84. Score means 83 and 84 are symmetrically arranged in oppositely arranged wall means of the resulting duct construction 77. The preformed sheet means 81 and 82 are then collapsed essentially as shown by solid lines in FIG. 13 of the drawings and as illustrated at 85 in FIG. 11.

The collapsed configuration sheet means 81 and 82 are then suitably fastened together adjacent their opposite side edges, as shown at 86 in FIG. 11, preferably by heat sealing each elongated strip 60 against an associated sheet means. The resulting collapsed configuration duct means 77 is then wound to define a suitable supply roll designated generally by the numeral 90.

The sections of sheet means 45 are preformed to define sheet means 81 and 82 as illustrated in the cross-sectional view of exaggerated thickness presented in FIG. 12 of the drawings and in particular it will be seen that fastening flange means are suitably defined so as to comprise an integral portion of each sheet means 81 and 82.

The air duct means 77 is formed so as to define a plurality of continuous fastening flange means for duct 77 extending from its corner edges and such fastening flanges are designated by the numerals 92, 93, 94, and 95. The fastening flanges 92—95 are similar to corresponding flanges 72—75 of the air duct means 62 previously described and flange means 92 and 95 also have multiple thickness comprised of a plurality of five layers similar to flanges 72 and 75 of the previous embodiment while flanges 93 and 94 each have a thickness comprised of six layers similar to flanges 73 and 74. The multiple thickness fastening flanges in air ducts 62 and 77 assure that once such ducts are fastened in position against associated supporting surface means there is little tendency for such duct means to tear.

Thus, it is seen that the exemplary air ducts 62 and 77 described above are in each instance comprised of a plurality of two sheet means which are suitably preformed, collapsed, fastened together and then rolled into roll form.

The air duct 62 has its sheet means 63 and 64 preformed so that in its collapsed configuration such air duct is effectively collapsed toward one side; however, the air duct 77 has its sheet means 81 and 82 preformed so as to enable it to be collapsed in a symmetrical manner so that both of its side wall means move outwardly approximately the same amount.

In particular, it will be seen that in air duct 77 the score lines 83 and 84 define opposite side edges of the collapsed duct 77 as seen at 86 in FIG. 11. Upon expanding the air duct 77 in position between a pair of joists, for example, the configuration of such duct means with its score lines 83 and 84 assures that the sidewall means in which score lines 83 and 84 are formed tend to move outwardly and thereby assure provision of a large air flow area.

However, it may be desirable and preferable in some applications of this invention to provide duct means which is made from single sheet means of material which may include one or more layers of metallic foil. In particular, it is seen that a single sheet means of material designated by the numeral 100 is provided in FIG. 14. Sheet means 100 may be suitably preformed in a similar manner as described in connection with the preforming of sheets 81 and 82 used to define air duct 77 and the forming of the single sheet means 100 is achieved so as to define the preformed configuration duct means shown at 101 in FIG. 15 of the drawings.

The sheet means shown at 101 has only one side edge means shown at 102 which must be suitably fastened. This fastening may be achieved using a suitable adhesive means or by heat sealing as previously described in connection with air ducts 62 and 77. The resulting air duct made from a single sheet means is designated by the numeral 103 and shown in FIG. 16 of the drawings in solid lines. The duct 103 may be collapsed to the dotted line configuration shown in FIG. 16 and a pair of score means 104 and 105 defined in its opposite sidewall means, in a similar manner as the score means 83 and 84 provided in the duct means 77, enable air duct 103 to be collapsed as shown.

Having thus formed the air duct 103 from the single sheet or web of material 100 and collapsed it to the dotted line configuration illustrated in FIG. 16 it will be appreciated that such collapsed duct may then be coiled to form a suitable supply roll for transportation, handling, storage, and the like. Also, the sheet means 100 used to form air duct 103 has not been shown in detail; however, it would be appreciated that sheet 100 may comprise any number of impermeable layers which are suitably bonded together and preferably it has at least one layer made of metallic foil.

The air duct 103 illustrated in FIG. 16 of the drawings also has multiple thickness fastening flanges formed as an integral part thereof in any known manner and extending from its four corners and such fastening flanges are designated by the numerals 112, 113, 114, and 115. Flanges 112—115 are of multiple thickness for increased strength and tear resistance and are utilized in fastening the air duct 103 in position against suitable supporting surface means such as parallel spaced apart joists of a building construction.

The duct means or air ducts 62, 77, and 103 are formed using any suitable technique to enable easy collapse and expansion thereof as previously mentioned. Also, it will be seen from the drawings that ducts 62, 77, and 103 are preferably formed so that upon expanding such ducts in position they each have a substantially rectangular cross-sectional outline which enables such duct means to be installed in position between a pair of adjacent floor joists or ceiling joists of a building construction.

Although the exemplary ducts 62, 77, and 103 are shown as having a substantially rectangular peripheral outline and having a continuous fastening flange extending from each corner, it will be appreciated that the technique of this invention may be utilized to define air duct means having other cross-sectional configurations as desired. Further, by providing duct means made essentially of metallic foil a comparatively inexpensive and unique means is provided for conveying air for heating and/or cooling purposes throughout a building construction. Also, the duct means of this invention are easy to store, transport, and install in position by comparatively unskilled personnel while utilizing existing structural members of a building construction to optimum advantage (as will be apparent from the following description), whereby the overall cost of providing an air distribution system using the duct means of this invention is comparatively small.

The manner in which the air duct means of this invention may be utilized in a building construction to provide economical means of distributing air throughout such building construction will now be presented. Thus, FIG. 17 shows a typical air duct system supported by floor joists of a building construction and is a view looking normally upwardly toward the floor joists. However, the showing of FIG. 17 could be considered a typical ceiling installation looking downwardly toward the ceiling joists.

The detailed description will now proceed arbitrarily treating the showing of FIG. 17 as being a typical basement installation wherein a source of heating and/or cooling air is introduced into one end of a comparatively large conduit means shown as a trunk line 116 as shown at 117. Trunk line 116 in this example of the invention is comprised of three basic sections having different cross-sectional areas and designated generally by the numerals 120, 121, and 122. However, it will be appreciated that the trunk line 116 may be of a given cross-sectional area throughout its length. The provision of trunk line 116 which reduces in cross-sectional area from its entrance end to its discharge end is typical of the type configuration utilized to assure effective air distribution throughout the building construction in an optimum manner and at minimum cost.

A detailed description will proceed describing the present preferred manner of joining the trunk line 116 with a typical transverse feeder duct means extending therefrom to an individual air outlet vent or register.

For ease of presentation, the detailed description will now proceed utilizing duct 77 to define the trunk line 116, including all of its sections 120—122, and air duct 62 is used to define the various feeder lines extending from trunk line 116. However, it will be appreciated that any of the air duct means 62, 77, or 103 or any desired combination thereof may be utilized throughout the building construction to define the trunk line and/or feeder ducts.

The manner of joining or interconnecting trunk line 116 with a typical feeder duct designated generally by the numeral 124 is illustrated in FIGS. 18—22 of the drawings and will be described in detail later. Also, each of the plurality of feeder ducts extending from opposite sides of trunk line 116 in FIG. 17 of the drawings has been designated by the numeral 124 to highlight that each may be interconnected to trunk line 116 in a similar manner.

Each conduit means or air conduit 124 is preferably defined by a pair of supporting means shown in this example of the invention as a pair of parallel spaced apart floor joists each designated by the numeral 125, see FIG. 32. Each air duct 62 is normally installed in position within joists 125 preferably before fastening an associated subfloor in position.

Thus, the roll 70 of collapsed air duct 62 is unrolled above a pair of adjacent parallel joists 125 until the desired length of duct 62 is provided. Any suitable means is then utilized to cut the unrolled section from roll 70. The upper fastening flanges 72 and 73 are then suitably fastened in position using suitable fastening means such as fastening staples, for example, designated by the numeral 130; only a representative few of such staples have been thus designated in the drawings.

The partially collapsed air duct 62 is then expanded to the configuration illustrated in FIG. 9 of the drawings by grasping its flanges 74 and 75 and pulling downwardly so as to stretch its opposite sidewall means designated by the numeral 131 along associated floor joists 125. The lower fastening flanges 74 and 75 are then stapled in position again utilizing staples 130. Thus, it is seen that the air duct 62 is fastened in position along at least three of its fastening flanges (four in this example) to assure that the air duct means will remain expanded at all times.

With air duct 62 thus expanded between its associated joists 125 it defines a substantially rectangular cross-sectional flow area having its sidewalls 131 extending along joists 125 and having a bottom surface 132 and a top surface 133 which are arranged in parallel spaced relation as defined by the configuration and arrangement of the associated floor joists 125. The subfloor designated by the numeral 134 may then be suitably fastened in position, using nails 137 or the like, along the top edges of floor joists 125 as illustrated in FIGS. 18 and 29. Similarly, if desired, supporting surface means shown as a cover 135 may be fastened as by nails 137 or the like across the lower edges of joists 125 so as to completely enclose and protect the air duct 62 with a rectangular boxlike construction after having fastened its flanges 72—75 in position along associated edges of floor joists 125.

The trunk line 116 is formed from three sections of air duct means 77 having the required areas and fastened end-to-end as shown in FIG. 17. Each portion of air duct 77 is preferably supported between supporting surface means comprised of a pair of associated parallel spaced apart supporting members each designated by the numeral 140. Duct 77 has its multiple thickness fastening flange means 92—95 also suitably fastened in position against an associated structural member 140 as by staples, or the like.

Upon fastening the flanges 92—95 of air duct 77 in position against associated supporting members 140 top and bottom protective covers designated by the numerals 142 and 143 are fastened in position as by nails 137.

With air duct 77 expanded and installed in position between supporting members 140 it will be seen that it defines an air passage of substantially rectangular peripheral outline and having a pair of sidewalls designated by the same numeral 144, a top surface designated by the numeral 145, and a bottom surface designated by the numeral 146.

Having described the manner in which the air ducts 62 and 77 are installed in position between associated supporting means or joists, the preferred manner of providing airflow passage means between adjoining air duct means will now be described. In particular, the manner of providing flow passage means designated generally by the numeral 149 between feeder conduit 124 and trunk line 116 will be described, see FIGS. 18—22.

In the installation of FIGS. 17 and 18, the trunk line 116 passes under the feeder conduit 124 and top cover 142 of trunk line 116 is interrupted so that the top surface of top wall 145 of air duct 77 is exposed. Similarly, feeder conduit 124 has its bottom surface or cover 135 discontinued between supporting joists 140 so that the bottom surface of bottom wall 132 of air duct 62 is exposed. Thus, it is seen that portions of air ducts 62 and 77 are placed against each other over an area having one dimension defined by the other over an area having one dimension defined by the distance between floor joists 125 and another dimension defined by distance between structural members 140.

With bottom wall 132 of air duct 62 against top wall 145 of air duct 77 an opening is severed simultaneously through both walls 132 and 145. In this example of the invention a Y-shaped slit or cut designated by the numeral 150 is provided through both walls 132 and 145 so as to define three double thickness flap means comprised of a pair of trapezoidal flaps each designated by the numeral 151 and a substantially triangular flap designated by the numeral 152. Each trapezoidal flap 151 is then preferably fastened as by stapling or taping against the inside surface of an associated floor joist 125. In a similar manner the triangular flap 152 is folded downwardly and suitably fastened as by stapling or taping against the inside surface of one of the structural members 140. Thus, it is seen that the opening 149 which extends between the trunk 116 and the feeder line 124 is of maximum cross-sectional area.

Slit 150 and hence opening 149 is defined by reaching inwardly toward the center of slit 150 from one end of air feeder conduit 124. The previously open end of conduit 124 is then preferably closed off by utilizing an end closure assembly 153.

End assembly 153 comprises an end block 155 preferably made using the same material used to make the floor joists 125 and a section of metallic foil 156 arranged in a U-shaped configuration and adapted to cover the inside surface of end block 155. End closure 153 also comprises a spacer 157 which is equal in thickness to the top cover 142 of the feeder line 116 and spacer 157 assures that an air tight closure will be provided in the end of air conduit 124.

With strip 157 fastened in position along the lower edge of end block 155, the U-shaped metallic foil 156 is then suitably fastened in position by stapling or the like along its top and bottom edges and the entire closure assembly 153 is then fastened in position as by nailing through the floor joists 125 using nails 162 as shown in FIG. 20.

Thus, it is seen that the comparatively inexpensive collapsible and expandible ducts of this invention can be utilized in connection with the floor joists normally required in a building construction and while using ordinary building materials which can be installed in position by a carpenter at the building site to define a unique and inexpensively formed air passage means defining a trunk line from an air source as well as feeder conduits to air registers, or the like.

In the illustrations of FIGS. 18—22 of the drawings a technique is illustrated for forming maximum area rectangular opening between a trunk line and a feeder conduit. However, it will be appreciated that by utilizing the comparatively thin and easily worked and inexpensive ducts 62, 77, and 103 of this invention it is readily possible to provide any type of size of opening between a trunk line and an associated feeder conduit. For example, it may be desired to provide a circular opening of a predetermined area between the trunk line and feeder conduit and in such instance the desired opening can be simultaneously severed between the bottom surface 132 of duct 62 and top surface 145 of duct 77 and the surfaces 132 and 145 may then be suitably sealed adjacent their cut edges. Thus, it may be desirable to fasten the adjoining surfaces 132 and 145 with adhesive tape so that such tape holds the walls 132 and 145 together while assuring that there is no leakage therebetween.

Having described the manner of joining feeder conduit to a trunk line, the manner of providing a riser duct assembly from a feeder conduit to an air register will now be described in connection with FIGS. 23 and 24 of the drawings. As seen particularly in FIG. 23, the air duct 62 extends to a vertical wall location and is provided with a pair of parallel spaced apart cuts therein each designated by the numeral 164 so as to define an upwardly extending tab 165. Another vertically arranged section of the expandible and collapsible air duct 62 designated by the numeral 166 is provided and adapted to extend from the feeder conduit 124 to a suitable air register. The section 166 comprises the air duct portion of the riser assembly.

Vertically arranged section 166 has a rear wall designated by the numeral 167 which comprises a downwardly extending planar portion 170 which has a height approximately equal to the height of feeder conduit 124. The section 166 has a front surface or wall 171 which is adapted to be installed into position against air duct 62 of air conduit 124 so that flap or tab portion 165 can be folded thereagainst and suitably fastened in position as by taping or the like. The front wall 171 of riser duct section 166 also has an opening 172 provided adjacent its top portion which is adapted to receive a suitable vent or air register therethrough.

Referring to FIG. 24 of the drawings, it is seen that with the riser portion 166 installed and suitably taped in position against the horizontally extending air duct 62, the four fastening flanges extending from section 166 are suitably fastened in position as by stapling or the like against associated support members such as parallel spaced apart studs 174 comprising a portion of the associated vertical wall. Suitable surface means are then installed against the front wall 171 and may comprise any suitable structural material 175 defining a portion of the associated vertical wall. The structural material may be a sheet used in dry wall construction or a suitable backing material for a wet wall construction.

Similarly, the rear wall 167 of section 166 may have a suitable structural material such as a wall member 176 suitably fastened thereagainst. In the event that the riser duct assembly is provided adjacent an outside wall of a building, the member 176 may comprise a portion of the outside structural material or a suitable vertical wall insulating material.

The air outlet vent provided adjacent the top of the air riser duct assembly may be of any desired configuration and is preferably an adjustable air register 177 installed in flow communication with opening 172. Also, an end closure block assembly designated generally by the numeral 178 is provided to seal the top end of the riser assembly. Closure 178 is made of a wood block 179 with a U-shaped piece of metallic foil 180 fastened in position therearound in a similar manner as U-shaped section 156 in end closure 153. End closure 178 is nailed in position between the associated vertical studs.

Although the description of the manner of joining feeder conduit 124 with a trunk line 116 has been presented in connection with a feeder conduit defined in floor joists it will be appreciated that such feeder conduit 124 could also be provided above suitable ceiling joists and the airflow connection between the trunk line and feeder conduit would be substantially identical to the connection previously described. In the event that a feeder conduit is provided between ceiling joists, the manner of providing an air vent or register in the ceiling is comparatively simple.

Thus, as seen in FIG. 25 of the drawings the ceiling trunk line also designated by the numeral 116 has opening means 149 extending therethrough to an associated feeder conduit also designated by the numeral 24. The ceiling vent is provided simply by cutting an opening 187 in the ceiling surface between a pair of associated joists and installing a suitable register or vent 190 in position. An end closure block assembly designated by the numeral 191 is also provided and assembly 191 is similar to assembly 178 and performs a similar function.

A plan view illustrating another technique of installing air feeder conduits from a trunk line extending diagonally across suitable joist means in a ceiling installation is shown in FIG. 26 of the drawings. Air is supplied from a suitable air source through an air bonnet 193 to a trunk line designated generally by the numeral 194 and comprised of a plurality of three interconnected end-to-end sections each having a different cross-sectional area. The three sections are designated by the numerals 195, 196 and 197 and the sections are arranged so that each larger area section is always closer to the air source as previously explained. Also, as in the trunk line 116, each section of the trunk line 194 will be comprised of air duct 77 for ease of presentation while the plurality of feeder conduit means each designated by the numeral 200 will extend from opposite sides of trunk line 194 and each is comprised of sections of air duct means 62 in a similar manner as previously. While air duct 62 is utilized in the feeder conduits and air duct 77 in the trunk line it will be appreciated that air duct means 62, 77 or 103 can be utilized singly or in any combination to provide the air distribution system illustrated in FIG. 26.

In the embodiment of FIGS. 26, 27, and 28, the trunk line 194 and the feeder conduits 200 are not provided with supporting and/or protective surfaces against their top and bottom surfaces. The duct 77 as installed in FIG. 27 is installed in position between a pair of supporting surface means shown as a pair of parallel members each designated by the numeral 202 extending substantially diagonally across ceiling joists 201. Air duct 77 has each of its fastening flanges 92—95 suitably fastened to an associated structural member 202 as by staples, or the like, a representative few of which have been designated by the numeral 203.

The structural members 202 support opposite side walls 144 of air duct 77 comprising trunk line 194 and once air duct 77 is expanded and fastened in position between members 202 it will be seen that a large area air passage is provided therethrough which will not tend to collapse. Further, it will be appreciated that in an attic installation of this type, there is little likelihood of damage to the exposed top and bottom surfaces of air ducts 62 and 77 and it is not absolutely necessary to protect such bottom and top surfaces although protected installations may be preferred and required in many instances.

In a similar manner as described in connection with the trunk line 194 it will be seen that each air feeder conduit 200 is defined by a section of air duct 62 suitably fastened between a pair of parallel spaced apart supporting members each designated by the numeral 205. The fastening flanges 72—75 of air duct 62 are each suitably fastened into position against an associated member 205 in any suitable manner, as by the use of staples, a representative few of which have been designated by the numeral 206. Thus, it is seen that the sidewalls 131 of air duct 62 are each held against an associated supporting member 205 upon expanding air duct means 62 in position and stapling its fastening flanges 72—75 in position.

FIGS. 27 and 28 also illustrate a technique for joining a feeder conduit 200 to the trunk line 194 which enables the joining of a pair of feeder conduits 200 on diametrically opposite sides of the trunk line 194. To interconnect a feeder conduit 200 with trunk line 194, an opening such as a rectangular opening 210 is provided in the feeder line 194 by cutting opening 210 through a member 202 and through an associated adjoining vertical sidewall 144 of air duct 77. The sidewall 144 of air duct 77 adjoining opening 210 is then suitably fastened against that portion of member 202 adjoining opening 210.

An associated air duct 62 which comprises the feeder duct 200 is then cut along its four corners so as to define four tabs each designated by the same numeral 212 extending outwardly about the periphery of the air duct 62. The tabs 212 are adapted to be urged against the outside surface of associated member 202 essentially about the periphery of opening 210 as indicated by the numeral at 213. With the flaps 212 thus held in position outwardly of the periphery of opening 210 the structural members 205 of feeder conduit 200 are then suitably fastened as by nailing against associated member 202 whereby an effective seal is provided between the end of feeder conduit 200 and trunk line 194. However, to further assure that an airtight seal is provided the flaps or tabs 212 are formed so as to extend substantially beyond the side of each supporting member 205 with each member 205 nailed in position against an associated member 202. The tabs 212 are then suitably fastened in position against member 202; and as seen in FIG. 28 of the drawings, the tabs 212 extending outwardly about the periphery of the feeder conduit 200 are preferably adhesively fastened to member 202 by strips of tape each designated by the same numeral 215 to assure that an air tight seal is provided.

The exemplary embodiment of this invention illustrated in FIGS. 26—28 of the drawings highlights the fact that the collapsible and expandable air duct means 62, 77, and 103 of this invention may be easily installed in position without requiring support and/or protection about the entire outer periphery thereof.

The air ducts 62 and 77 may be installed across the ceiling joists in any suitable manner. One technique is to unroll and cut a desired length of either duct 62 or 77, as the case may be, from an associated supply roll. The particular air duct may be suitably held in position, as by stapling its lower fastening flanges to the ceiling joists 201. A pair of associated structural members may then be fastened in position in parallel spaced apart relation each over an associated lower or bottom fastening flange. The particular air duct 62 and 77 is then expanded by pulling it upwardly between its structural members and its top fastening flanges are each fastened to top edge means of an associated member. The lower flanges of the particular air duct may each also be fastened to associated lower edge means of an associated structural member at locations between the ceiling joists.

As previously mentioned, each of the trunk lines 116 and 194 previously described is preferably made of a plurality of air duct means of different sizes and each having associated supporting member means extending along opposite side edges thereof for supporting each particular size air duct means. The trunk line 116 illustrated in FIG. 17 has three different size duct means comprised of portions 120, 121, and 122 each having a different cross-sectional area as previously mentioned and being arranged in the air distribution system in the manner previously described and for reasons as previously presented. The detailed description will now proceed with a description of the unique and inexpensive manner in which it is possible to form transition conduit means extending between two air duct means of different sizes, see FIGS. 32—35.

The trunk line 116 has been described as being made of different size sections of air duct 77. The description will now proceed with a description of transition conduit means designated generally by the numeral 226 and interconnecting section 121 and 122 of trunk line 116. For ease of presentation the larger area duct associated with trunk line portion 121 will be designated by the numeral 77A and the smaller cross-sectional area duct associated with trunk line portion 122 will be designated by the numeral 77B and corresponding component portions of air ducts 77A and 77B and adjoining supporting structure will be given the identical numeral designation as previously described in connection with the overall description of air duct 77 followed by the letter designation "A" or "B," depending upon whether it comprises a portion of trunk line portion 121 or 122 respectively.

Portions 77A and 77B are fastened in position against associated supporting structure is previously explained and therefore the technique employed for fastening such portions in position will not be described again in detail. Only the transition portion 226 will be described in detail. Thus, as illustrated particularly in FIGS. 33 and 35, members 140A, 142A, and 143A are cut substantially in a common plane as illustrated at 227.

The preferred technique is to allow a portion of larger cross-sectional area duct 77A to extend beyond plane 227 by a distance indicated at 230. The terminal end of the larger cross-sectional area duct 77A is then folded inwardly in a tapering manner creating a plurality of four substantially multiple thickness triangular flaps each designated by the numeral 231 extending along opposite corners thereof. This technique of folding the larger air duct 77A into a substantially tapering manner enables the use of a continuous section of duct 77A to extend between and define the air duct portion of transition section 226. The triangular flap portions 231 are then folded substantially coplanar with their associated tapering side walls and the terminal end area of duct 77A is reduced to an area corresponding to (being substantially equal to) the area of air duct portion 77B. In this exemplary illustration the duct 77A is not only tapered inwardly at its sides but it is also tapered downwardly as shown at 233 in FIG. 33 in accordance with the reduced height of the duct portion 77B which is smaller in height than duct portion 77A.

The terminal end of the tapered portion of duct 77A is then suitably fastened into position to duct portion 77A as by taping, adhesive fastening, or the like, and suitable protective means is provided along the tapering side surfaces and the top and bottom surfaces of the transition conduit section 226. The protective members for conduit section 226 comprise a pair of substantially trapezoidal members located at the top and bottom thereof and designated by the numerals 235 and 236 respectively and a pair of substantially identical tapering members each designated by the same numeral 237. With the structural members comprising the sections 121 and 122 of trunk line 116 suitably fastened in position, the members 235, 236, and 237 are fastened in position in any suitable manner after sealing the tapered terminal end of air duct portion 77A in position against air duct portion 77B to provide a protected transition conduit 226.

Although in this example of the invention the transition conduit section 226 is shown as being tapered in a symmetrical manner along opposite sides thereof it will be appreciated that a transition section similar to section 226 could also be provided between portions 120 and 121 of the trunk line 116 wherein only one side tapers rather than the two opposite sides tapering in a symmetrical manner. Also, it may be desired in some applications to form the air conduit between sections 77A and 77B using an appropriate length of conduit 77A which is then taped to the associated ends of conduits 77A and 77B.

In this disclosure of the invention the various embodiments of collapsible and expandable air ducts are shown as being installed in position and supported by associated wooden support means such as joists, and the like. However, it will be appreciated that the air duct means of this invention, made substantially of metallic foil, may be used with and supported by any desired type of means such as metal members, or the like.

The sheet means 45 used to make the air ducts of this invention was described early in this disclosure as being made of a plastic material bonded between a pair of layers of metallic foil. It will be appreciated that any desired number of impermeable layers or any desired arrangement of such impermeable layers made of any suitable material capable of being used with metallic foil may be used to define the unique easily collapsible and expandable air cut means of this invention.

Each exemplary air duct means or air duct 62, 77 and 103 has a plurality of peripherally spaced apart integral fastening flange means extending outwardly therefrom and in this example four continuous fastening flanges are provided, each spaced 90 degrees apart from an adjacent flange. At least three fastening flanges have been shown to be most effective in assuring that a large airflow area is maintained. The use of at least three spaced apart fastening flanges further assures that with negative pressure within the particular air duct such air duct will not collapse. It will be appreciated that the air duct means of this invention may also be utilized in an air circulating system as return air ducts wherein negative pressures are quite common.

The exemplary air duct means or air ducts 62, 77, and 103 utilize plastic layer means bonded between a pair of layers of metallic foil, as previously explained. The use of a plastic layer of the character described, together with one or more layers of metallic foil, provides unique advantages. In particular, the plastic layer provides thermal insulation for its associated air duct means. In addition, it has been shown that the plastic layer cooperates with the layer means of metallic foil to provide air ducts having high strength and optimum tear resistance.

Therefore, air ducts 62, 77, and 103 can withstand considerable abuse during handling and installation because of the improved strength provided by the plastic layer means. Also, it will be appreciated that a plurality of plastic layers may be utilized with one or more layers of metallic foil to provide impermeable sheet means having alternating layers of plastic and metallic foil.

Each plastic layer utilized in each air duct 62, 77, and 103 generally has a thickness which in this example is no greater than the thickness of a metallic foil layer bonded thereagainst. With metallic foil, such as aluminum foil, being usually considered as having a thickness ranging approximately between 0.00035 inch and 0.005 inch, for example, it will be appreciated that the overall thickness of the wall means of air ducts 62, 77, and 103 comprised of such plastic layer bonded between two layers of metallic foil is quite thin. Yet, as previously mentioned, each of such air ducts has high strength and tear resistance, is provided with some thermal insulation, and is very easy to handle and install at a using location.

Thus, it is seen that this invention provides suitable means for transferring conditioned air whether it be heating and/or cooling air from a suitable supply source through a trunk line and then through feeder conduits to suitable outlets such as air registers. And such registers may be provided in association with installation of the duct means of this invention in a floor and/or ceiling.

Also, it will be appreciated that while an air supply system such as a furnace, air conditioner, or the like, has not been illustrated, FIG. 31 illustrates the top end portion of bonnet means designated generally by the numeral 193 for connecting trunk line means such as a trunk line 194 of an air conduit system installed in an attic to a suitable furnace, or the like.

Thus, it is seen that an improved collapsible and expandable air duct means made substantially of metallic foil and a method of making same has been provided by this invention.

Terms such as "upwardly," "downwardly," "left," "right," "sides," "end," "top," "bottom" and the like, have been used in this disclosure of the invention for ease of description and to correspond to the arrangement of various members as illustrated in the drawings and such terms should not be considered as limiting the scope of this invention in any way.

While present preferred embodiments of this invention, and methods of practicing the same, have been illustrated and described, it will be recognized that this invention may be otherwise variously embodied and practiced within the scope of the following claims.

We claim:

1. Air duct means for a building construction made substantially of metallic foil, said air duct means comprising a plurality of flexible interconnected substantially planar walls, said air duct means being completely preassembled and being readily collapsed and rolled into a roll with the longitudinal axis thereof arranged in coil form for easy storage and handling and readily expanded into a tubular configuration having a polygonal cross-sectional outline for use in said building construction, said air duct means comprising a plurality of integral multiple thickness fastening flange means adapted to be used in fastening said air duct means in its expanded condition against adjoining supporting means, and said plurality of fastening flange means being adapted to hold said air duct means in its expanded condition even with negative pressure in said air duct means.

2. Air duct means as set forth in claim 1 in which said polygonal cross-sectional outline is defined by said planar walls interconnected to define at least three corners and said plurality of integral fastening flange means comprises at least three integral fastening flanges each extending from an associated one of said corners.

3. Air duct means as set forth in claim 1 made from sheet means comprised of a plurality of impermeable layers wherein at least one of said layers is made of metallic foil.

4. Air duct means for a building construction made from sheet means comprised of a plurality of flexible impermeable layers wherein at least one of said layers is made of metallic foil, said air duct means being completely preassembled and being readily collapsed and rolled into a roll with the longitudinal axis thereof arranged in coil form for easy storage and handling and readily expanded into a tubular configuration for use in said building construction, said air duct means comprising a plurality of integral multiple thickness fastening flange means adapted to be used in fastening said air duct means in its expanded condition against adjoining supporting means, and said plurality of fastening flange means being adapted to hold said air duct means in its expanded condition even with negative pressure in said air duct means, said plurality of impermeable layers comprising a plastic layer bonded between a pair of layers of metallic foil, said plastic layer providing thermal insulation for said air duct means and cooperating with said layers of metallic foil to provide said air duct means having optimum strength and tear resistance.

5. Air duct means as set forth in claim 4 in which said sheet means comprises sheet means formed and fastened together so as to enable defining said tubular configuration having a substantially rectangular cross-sectional outline and having said plurality of integral fastening flange means extending from associated corner means of said substantially rectangular outline.

6. Air duct means as set forth in claim 5 in which said plurality of integral fastening flange means comprises at least three substantially continuous multiple thickness fastening flanges each extending outwardly from an associated corner of said rectangular outline, said three fastening flanges being adapted to hold said air duct means in its expanded condition even with negative pressure in said air duct means.

7. Air duct means as set forth in claim 5 in which said sheet means comprises a plurality of sheet means.

8. Air duct means as set forth in claim 5 further comprising rectilinear score means in each of a pair of oppositely arranged wall means of said tubular configuration air duct means, said score means assuring that upon expanding said air duct means the normal tendency of each of said pair of wall means is to move outwardly to assure provision of a large flow area.

9. Air duct means for a building construction made from sheet means comprised of a plurality of flexible impermeable layers wherein at least one of said layers is made of metallic foil, said air duct means being completely preassembled and being readily collapsed and rolled into a roll with the longitudinal axis thereof arranged in coil form for easy storage and handling and readily expanded into a tubular configuration for use in said building construction, said air duct means comprising a plurality of integral multiple thickness fastening flange means adapted to be used in fastening said air duct means in its expanded condition against adjoining supporting means, and said plurality of fastening flange means being adapted to hold said air duct means in its expanded condition even with negative pressure in said air duct means, said sheet means comprising a single sheet having said plurality of impermeable layers defined by a first layer made of metallic foil, a second layer made of a heat sealable plastic material and having a width equal to the width of said first layer, and a third layer made of metallic foil and being smaller in width than said first and second layers so as to define an integral exposed elongated strip of heat sealable plastic material along a side edge portion of said sheet means, said sheet means having an opposite side edge portion which is heat sealed against said elongated strip upon forming and fastening said sheet means together to define said tubular configuration air duct means having a substantially rectangular cross-sectional outline and having said integral fastening flange means extending from corner means of said substantially rectangular outline, said plastic layer providing thermal insulation for said air duct means, and cooperating with said layers of metallic foil to provide said air duct means having optimum strength and tear resistance.

10. Air duct means for a building construction made from sheet means comprised of a plurality of flexible impermeable layers wherein at least one of said layers is made of metallic foil, said air duct means being completely preassembled and being readily collapsed and rolled into a roll with the longitudinal axis thereof arranged in coil form for easy storage and handling and readily expanded into a tubular configuration for use in said building construction, said air duct means comprising a plurality of integral multiple thickness fastening flange means adapted to be used in fastening said air duct means in its expanded condition against adjoining supporting means, and said plurality of fastening flange means being adapted to hold said air duct means in its expanded condition even with negative pressure in said air duct means, said sheet means comprising a plurality of sheet means, each of said plurality of sheet means having said plurality of impermeable layers comprising, a first layer made of metallic foil, a second layer made of a heat sealable plastic material and having a width equal to the width of said first layer, and a third layer made of metallic foil and being smaller in width than said first and second layers so as to define an integral exposed elongated strip of heat sealable plastic material along a side edge portion of each of said sheet means, each of said plurality of sheet means being prescored to enable easy forming thereof to define a desired configuration air duct means and the elongated strip of each sheet means is heat sealed against an associated side edge portion of metallic foil of an adjoining sheet means to define said air duct means and the portion of each sheet means adjoining an associated elongated strip cooperates with said associated elongated strip to define an associated multiple thickness fastening flange means, said plastic layer providing thermal insulation for said air duct means and cooperating with said layers of metallic foil to provide said air duct means having optimum strength and tear resistance.

11. In combination: a building construction having supporting means, air duct means made from sheet means comprised of a plurality of flexible impermeable layers wherein one of said layers is made of metallic foil, said air duct means comprising a plurality of interconnected substantially planar walls, said air duct means being completely preassembled and being readily collapsed and rolled into a roll with the longitudinal axis thereof arranged in coil form for easy storage and handling and readily expanded into a tubular configuration for use in said building construction, said tubular configuration having a polygonal cross-sectional outline defined by said interconnected planar walls, said air duct means having a plurality of peripherally spaced apart integral multiple thickness fastening flange means, and fastening means for fastening said air duct means to said supporting means by fastening said fastening flange means thereagainst, said air duct means being readily expanded and fastened to said supporting means using said fastening flange means to define an air conduit means for said building construction and said spaced apart fastening flange means cooperating to hold said air duct means in its expanded condition even with negative pressure therein.

12. The combination as set forth in claim 11 in which said air duct means comprises a pair of said air duct means of different sizes each having associated supporting means and further comprising transition means for placing said pair of air duct means in flow communication, said transition means being made of an air duct section defined by folding a section of the larger one of said pair of air duct means to define said air duct section having a tapering configuration and support surface means for supporting said air duct section in position.

13. The combination as set forth in claim 11 in which said air duct means comprises a plurality of said air duct means each having associated supporting means, and further comprising flow passage means extending between adjoining air duct means, said flow passage means being easily formed at the using location by, placing portions of said adjoining air duct means against each other, simultaneously severing opening means through said portions, and fastening peripheral surface means of said air duct means adjoining said opening means together to define said flow passage means.

14. The combination as set forth in claim 11 in which said air duct means comprises a plurality of said air duct means each having associated supporting means and further comprising flow passage means placing adjoining air duct means in flow communication, said flow passage means being defined by severing an opening in one of said adjoining duct means and placing an open terminal end of another of said adjoining duct means around said opening and fastening said terminal end thereagainst to define said flow passage means.

15. The combination as set forth in claim 11 in which said supporting means comprises a pair of spaced apart joist means and said duct means is supported and held in said expanded configuration against said joist means by said fastening means extending through associated ones of said plurality of fastening flange means.

16. The combination as set forth in claim 15 further comprising supporting surface means fastened between said joist means to further support and protect said expanded duct means.

17. The combination as set forth in claim 16 in which said supporting surface means comprises a pair of surface means extending between both end means of said joist means to thereby define an enclosure extending substantially completely around said duct means.

18. The combination as set forth in claim 15 in which said plurality of fastening flange means provided in said air duct means comprises at least three fastening flange means.

19. The combination as set forth in claim 15 in which said duct means is made from sheet means comprised of a plurality of impermeable layers wherein at least one of said layers is made of metallic foil.

20. In combination: a building construction having supporting means, air duct means made from sheet means comprised of a plurality of flexible impermeable layers wherein at least one of said layers is made of metallic foil, said air duct means being completely preassembled and being readily collapsed and rolled into a roll with the longitudinal axis thereof arranged in coil form for easy storage and handling and readily expanded into a tubular configuration for use in said building construction, said tubular configuration having a polygonal cross-sectional outline, said air duct means having a plurality of peripherally spaced apart integral multiple thickness fastening flange means, and fastening means for fastening said air duct means to said supporting means by fastening said fastening flange means thereagainst, said air duct means being readily expanded and fastened to said supporting means using said fastening flange means to define an air conduit means for said building construction and said spaced apart fastening flange means cooperating to hold said air duct means in its expanded condition even with negative pressure therein, said supporting means comprising a pair of spaced apart joist means and said duct means being supported and held in said expanded configuration against said joist means by said fastening means extending through associated ones of said plurality of fastening flange means, said plurality of layers comprising a plastic layer bonded between outer layers of metallic foil, said plastic layer being no greater in thickness than said layers of metallic foil, providing added thermal insulation for said air conduit means, and cooperating with said layers of metallic foil to provide said air duct means having optimum strength and tear resistance.

21. The combination as set forth in claim 20 in which said joist means are arranged in parallel spaced apart relation and in which said sheet means comprises sheet means formed and fastened to define said polygonal cross-sectional outline in the form of a substantially rectangular cross-sectional outline and having said plurality of integral fastening flange means each extending from an associated corner means of said substantially rectangular outline as a substantially continuous flange, each of said fastening flange means being fastened by said fastening means to an associated joist means to hold said air duct means in its expanded condition.

22. The combination as set forth in claim 21 further comprising rectilinear score means in each of a pair of oppositely arranged wall means of said tubular configuration duct means, said score means assuring that upon extending and fastening said fastening flange means to said joist means the normal tendency of each of said pair of wall means is to move outwardly to assure provision of a large flow area.